United States Patent [19]

Kwun et al.

[11] Patent Number: 5,747,696
[45] Date of Patent: May 5, 1998

[54] METHOD OF NON-INVASIVELY MONITORING PRESSURE OF A COMPRESSED GAS IN A CLOSED CONTAINER

[75] Inventors: Hegeon Kwun, San Antonio, Tex.; Michael Allen Piskie, Royal Oak; Tony Gioutsos, Brighton, both of Mich.

[73] Assignee: Temic Bayern-Chemie Airbag GmbH, Aschau, Germany

[21] Appl. No.: 738,498

[22] Filed: Oct. 28, 1996

[51] Int. Cl.[6] .................................................. G01L 9/10
[52] U.S. Cl. ........................ 73/728; 73/700; 73/DIG. 2
[58] Field of Search .......................... 73/700, 702, 728, 73/722, DIG. 2

[56] References Cited

U.S. PATENT DOCUMENTS

| | | | |
|---|---|---|---|
| 2,376,156 | 2/1945 | Kuehni | 73/DIG. 2 X |
| 2,461,635 | 2/1949 | Feller | 73/DIG. 2 X |
| 2,583,941 | 1/1952 | Gordon, Jr. | 73/728 X |
| 3,168,830 | 2/1965 | Chass | 73/DIG. 2 X |
| 3,197,722 | 7/1965 | Chass | 73/DIG. 2 X |
| 3,229,524 | 1/1966 | Jewell | 73/DIG. 2 X |
| 3,681,982 | 8/1972 | Hiratsuka et al. | 73/DIG. 2 X |
| 4,161,665 | 7/1979 | Buck et al. | 73/DIG. 2 X |
| 4,289,987 | 9/1981 | Russell et al. | 73/728 X |
| 5,272,294 | 12/1993 | Charboneau et al. | |
| 5,331,126 | 7/1994 | Dwyer et al. | |

FOREIGN PATENT DOCUMENTS

| | | |
|---|---|---|
| SU 1438-295-A | 5/1989 | U.S.S.R. |
| SU 1493-894-A | 7/1989 | U.S.S.R. |

OTHER PUBLICATIONS

Kwun, Hegeon, "Back in Style: Magnetostrictive Sensors" *Technology Today*, Mar. 1995, (reprint), pp. 1-7.

Siemens Aktiengesellschaft, "Magnetic Sensor Data Book" pp. 26-28.

*Primary Examiner*—George M. Dombroske
*Assistant Examiner*—Paul D. Amrozowicz
*Attorney, Agent, or Firm*—Spencer & Frank

[57] ABSTRACT

A method for non-invasively monitoring a pressure of a compressed gas inside a closed container includes: forming a magnetic circuit through a portion of the outside wall of the container; detecting magnetic flux amplitude changes in the magnetic circuit created by a transient stress in the outside wall of the container; producing data representing the magnetic flux amplitude changes; and monitoring pressure changes from a nominal pressure by evaluating the data representing the magnetic flux amplitude changes.

18 Claims, 6 Drawing Sheets

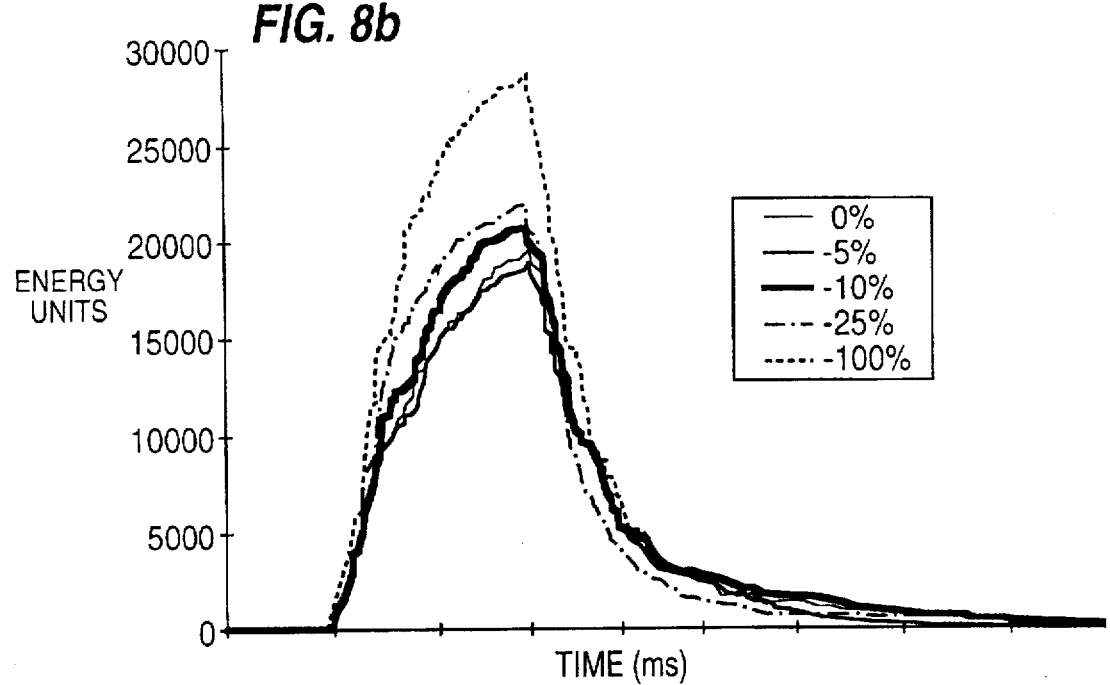
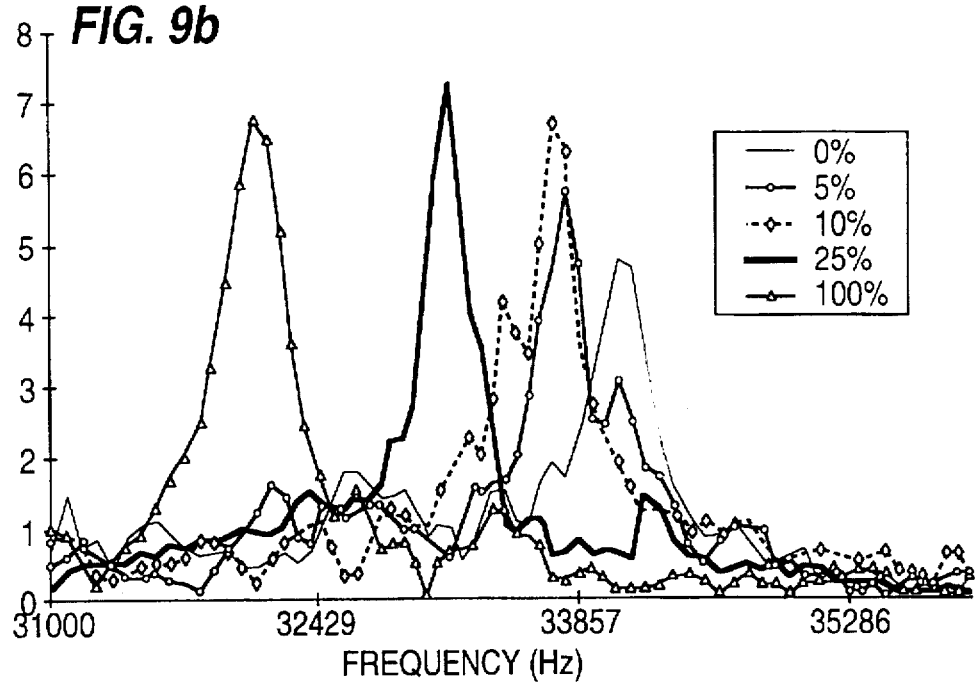

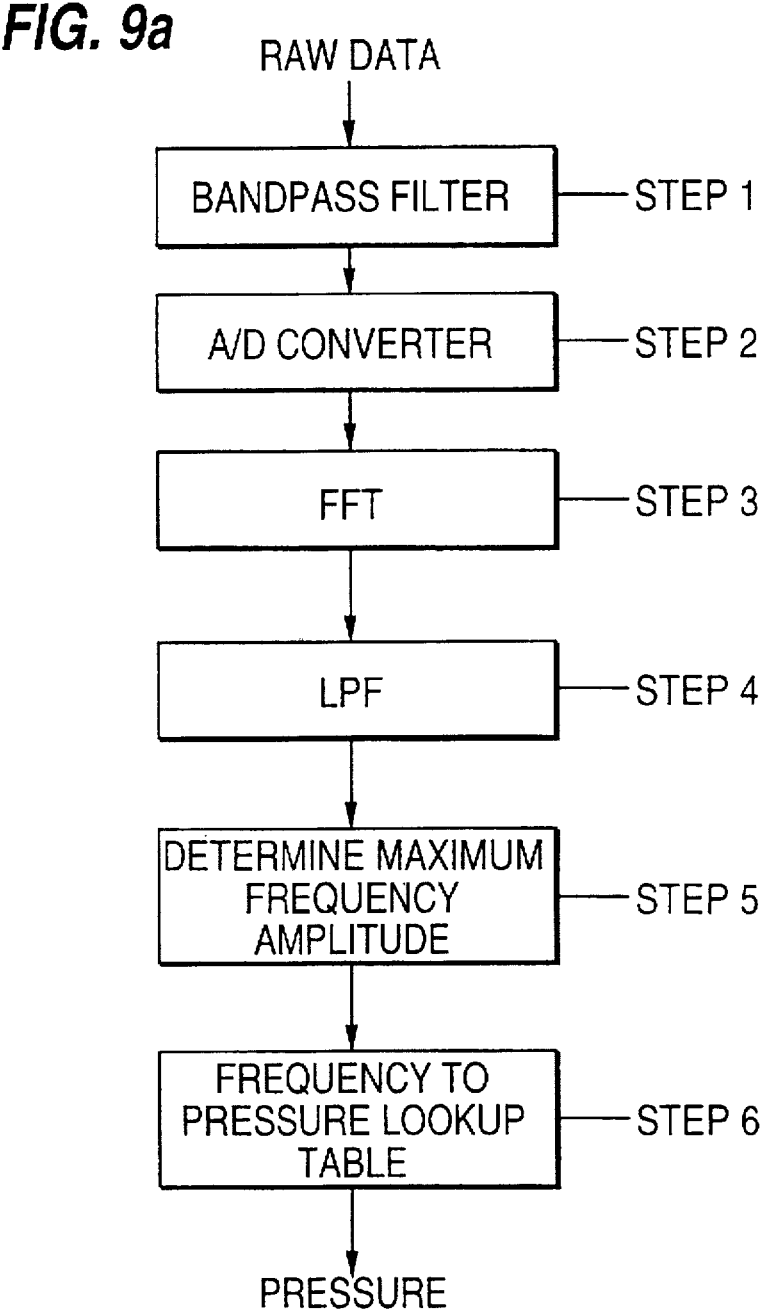

METHOD OF NON-INVASIVELY MONITORING PRESSURE OF A COMPRESSED GAS IN A CLOSED CONTAINER

BACKGROUND OF THE INVENTION

The invention relates to a method for non-invasively monitoring pressure of a compressed gas in a closed container, such as a sealed compressed gas cylinder in a gas generator for an automobile air bag system.

Almost all newly manufactured motor vehicles contain standard restraint systems for the protection of occupants in the event of an accident. Air bag systems and belt tightners are the most widely used systems. Impact-absorbing bags employed in air bag systems are built into the steering wheel, and in some cases into the dashboard, doors and/or seats. In the event of being triggered, the air bag is inflated with gas within a few milliseconds, with the gas being produced by a gas generator.

Gas generators used for this purpose are of the pyrotechnic type or compressed gas type. The pyrotechnic type gas generator generates a hot gas from a solid propellant. The compressed gas generator releases a harmless, inert gas or gas mixture which is stored at a high pressure in a pressure vessel or cylinder. The compressed gas generators are increasingly replacing the pyrotechnic gas generators in order to comply with legally prescribed ambient air quality standard and other requirements of the automobile industry. It is desirable to be able to measure the pressure within the pressure cylinder at the end of the manufacturing line, and possibly again just prior to installation, to ensure that the compressed gas has the proper pressure to operate as an air bag inflator. It would also be valuable to have a cost effective mechanism for monitoring the depressurization of the pressure cylinder in a crash situation to provide post crash analysis to certify that the gas generator functioned properly at the time of its deployment.

Currently, existing stored-gas inflators employ various pressure-sensing or pressure switching devices which are inserted into the wall of the stored gas cylinder. The purpose of such a device is to ensure that the pressure of stored gas is maintained at the required level for operation of the air bag inflator. The approach of using an invasive sensor has a serious drawback. The opening made in the pressure cylinder wall for insertion of a sensor creates a potential leak area, and the overall reliability of the air bag system is thus lowered as a result. Furthermore, the porting and sealing techniques used for attaching an invasive sensor to the cylinder wall is not of sufficient reliability and the process required to implement the present approach increases the overall system cost.

SUMMARY OF THE INVENTION

It is therefore an object of the invention to provide a method for non-invasively and cost effectively determining the proper functioning of a high-pressure stored-gas cylinder.

The above and other objects are accomplished according to the invention by the provision of a method for non-invasively monitoring a pressure of a compressed gas inside a closed container having an outside wall, comprising: forming a magnetic circuit with a portion of the outside wall of the container; detecting magnetic flux amplitude changes in the magnetic circuit created by a transient stress in the outside wall of the container and producing data representing the magnetic flux amplitude changes; and monitoring pressure changes from a nominal pressure by evaluating the data representing the magnetic flux amplitude changes.

The invention is based upon the well known phenomenon referred to as the inverse magnetostrictive effect in which a physical deformation or strain produces a change of magnetization of a ferromagnetic material. This was first reported by E. Villari in 1865. See, for example, Kwun, Hegeon, "Back in Style: Magnetostrictive Sensors", *Technology Today*, March 1995.

According to one embodiment of the invention the monitoring step includes fast fourier transforming the data, detecting a peak frequency from the fast fourier transformed data, and comparing the peak frequency with a calibrated frequency corresponding to the nominal pressure to determine a variation in pressure from the nominal pressure.

This embodiment of the invention is particularly useful for ensuring quality control at the end of a production line for the compressed gas cylinders. In a particular advantageous implementation of this method a transient stress is generated in the outside wall of the container, for example by dropping a ball bearing, such as a steel ball bearing, from a predetermined height onto the outside wall to create the transient stress which is then monitored. Advantageously, the sensor is in the form a magnetostrictive sensor that includes a magnet and the sensor is placed on or near the outside wall of the container for forming the magnetic circuit and is used for detecting the magnetic flux changes.

In another embodiment of the invention, the monitoring step is carried out by converting the data into an energy waveform that represents a measure of energy and evaluating the energy waveform. The energy waveform is created by squaring the data representing the magnetic flux amplitude changes.

This embodiment of the method may be utilized for evaluating the performance of the depressurization of a pressurized container during a crash, for purposes of post-crash evaluation. In accordance with this aspect of the invention an interval is determined between a point in time from the initiation of a rapid depressurization to a point in time at which the energy waveform first reaches a predetermined energy level. The measured interval corresponds to the pressure in the cylinder just prior to depressurization.

This embodiment of the invention can also be utilized for quality control purposes at an end-of-line manufacturing process by utilizing a mechanical impact technique similar to that discussed above. However, in this case, instead of performing a fast fourier transform on the amplitude data, an energy waveform is generated by squaring the data and a peak amplitude of the energy waveform is compared with a calibrated amplitude corresponding to a zero percent pressure drop from a nominal pressure. A substantial difference between the detected peak amplitude and the calibrated amplitude corresponding to the nominal pressure would indicate that a leak has likely occurred and that the pressure vessel is not suitable for deployment.

According to a further advantageous embodiment of the invention, a magnetostrictive sensor utilized for creating the magnetic circuit and for detecting the magnetic flux changes comprises a magnet in a form of a permanent magnet or an electromagnet which has a U-shaped cross-section presenting legs each containing a wire winding. Such a configuration for the magnetostrictive sensor is particularly advantageous for carrying out the method of the invention.

BRIEF DESCRIPTION OF THE DRAWINGS

FIG. 8a is a functional flow diagram of a variation of the algorithm represented by FIG. 7a.

FIG. 8b shows transient energy waveforms converted from magnetostrictive amplitude data resulting from an impact stress on a compressed gas cylinder wall at various pressures for explaining the method according to FIG. 8a.

FIG. 9a is a functional flow diagram showing another embodiment of the method according to the invention.

FIG. 9b shows the frequency responses of magnetostrictive amplitude data resulting from an impact stress on a compressed gas cylinder wall at various pressures.

DETAILED DESCRIPTION OF THE PREFERRED EMBODIMENTS

Figure 1:
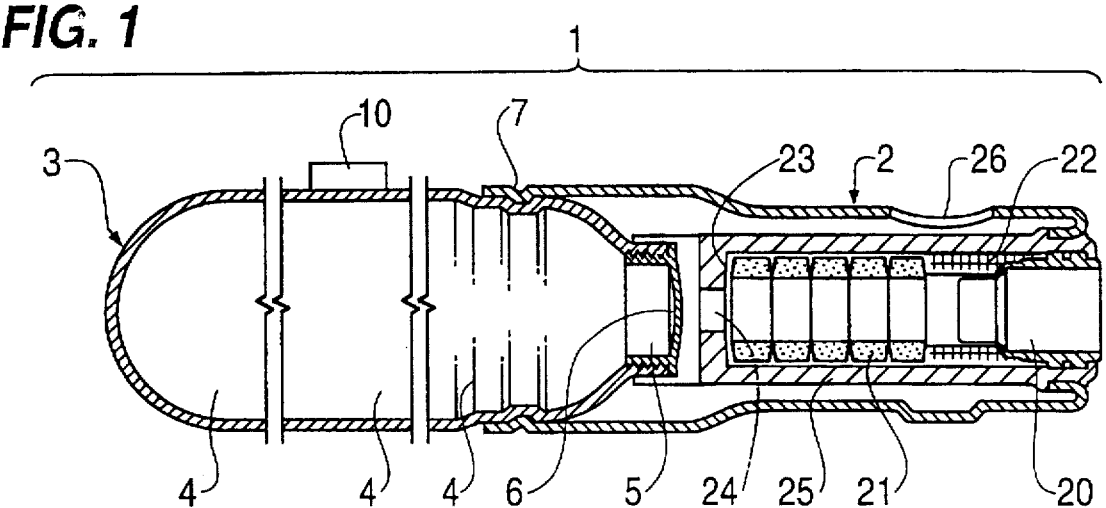
FIG. 1 illustrates a cross-section of a gas generator for an air bag and contains a compressed gas cylinder having a sensor placed on its exterior for implementing the method according to the invention.

Referring to FIG. 1 there is shown a gas generator 1 including primarily two parts, namely an ignition unit 2 and a closed container in the form of a pressure cylinder 3 held together by a formed-fitting connection 7. Pressure cylinder 3 has a wall 4 comprised mostly of steel and includes a nozzle 5 sealed by a bursting diaphragm 6 for storing a compressed gas.

Ignition unit 2 is comprised of an ignitor 20, triggered in a known fashion, and which, upon triggering, ignites a propellant 21 which generates a hot gas. A filler body 22 ensures a reliable support of propellant 21 which is usually pressed into pellets and arranged in a combustion chamber 25. A supporting screen 23 keeps solid and hot combustion products generated during combustion of propellant 21 out of the hot gas.

After a triggering of ignitor 20, bursting diaphragm 6 of pressure cylinder 3 is opened in that hot gas generated in combustion chamber 25 exits through combustion nozzle 24 and arrives at bursting diaphragm 6 which is thus heated and melted through.

Subsequently, the stored compressed gas leaves pressure cylinder 3 and mixes with the hot gas produced from propellant 21 in combustion chamber 25, which hot gas cools down during expansion. The resulting gas mixture leaves gas generator 1 through a blow-off aperture 26 after passing through known fine filters (not shown) and may be used to inflate an impact-absorbing bag for an automobile air bag system.

Figure 2:
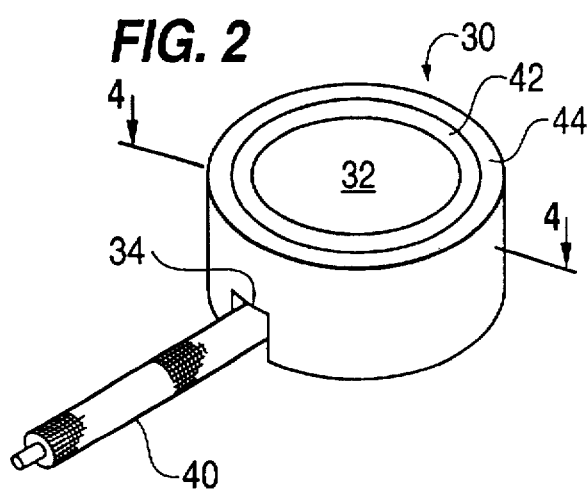
FIG. 2 shows a perspective view of a magnetostrictive sensor for use in FIG. 1.
Figure 3:
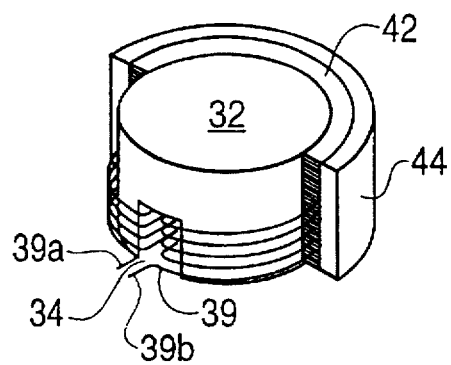
FIG. 3 is a perspective view, in partial section, of the magnetostrictive sensor of FIG. 2.
Figure 4:
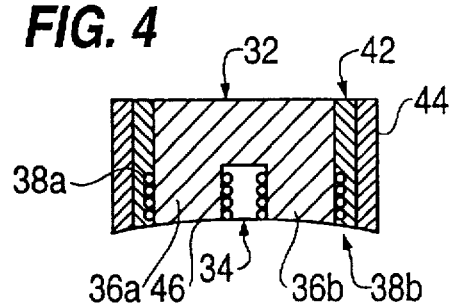
FIG. 4 is a radial cross-section of the magnetostrictive sensor in FIG. 2 along the line of 4—4.

A pressure monitoring unit 10 is arranged at a position on wall 4 of pressure cylinder 3. As shown in FIGS. 2 through 4, pressure monitoring unit 10 preferably comprises a magnetostrictive sensor 30 including a magnet 32 which is generally cylindrical in shape. Magnet 32 has a diametrical slot 34 at one end and thus exhibits a U-shaped cross-section with two legs 36a, 36b, each of which legs is surrounded by a wire winding 38a, 38b, respectively, formed by a single wire 39 which has two leads 39a, 39b connected to a coaxial cable 40 (FIG. 2) for extracting a voltage induced in windings 38a, 38b by the magnetostrictive effect when sensor 30 is in place on pressure cylinder 3. Windings 38a, 38b are preferably coated with a potting material 42, such as a suitable epoxy, and a protective case 44, made for example of stainless steel, is placed on the outside of the potting material as shown in FIGS. 2–4. Sensor 30 has a bottom 46 which may be flat or, preferably, curved to match the contour of a pressure cylinder as shown in FIG. 4. Such a magnetostrictive sensor can detect dynamic stresses over a broad frequency range, from a few Hz to over 100 kHz, without requiring a coupling or bonding material.

When in use, the magnetostrictive sensor is simply placed on or near outside wall 4 of pressure cylinder 3. An adhesive tape may be applied over the sensor to keep it in place over the lifetime of the pressure cylinder. No special coupling or bonding material is required between the magnetostrictive sensor and the wall of the pressure cylinder which makes the magnetostrictive sensor inherently more reliable than, for example, a piezoelectric sensor which, although usable to detect transient stress signals in the wall of the cylinder, requires special coupling or bonding material which is subject to failure. Additionally, a magnetostrictive sensor is rugged and more cost effective to implement than piezoelectric sensors and is therefore preferred for implementing the method of the invention.

Figure 5:
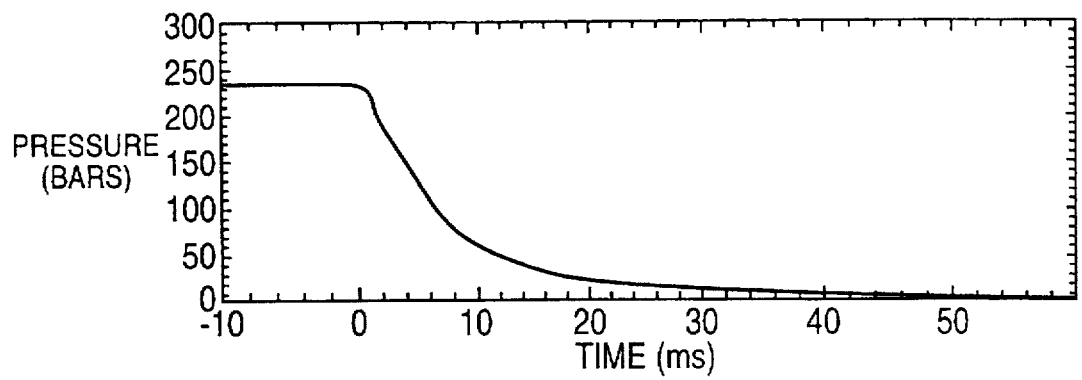
FIG. 5 is a graph showing pressure vs. time during a rapid depressurization of a compressed gas cylinder.

FIG. 5 is a graph of pressure versus time which shows a rapid depressurization of a compressed gas cylinder, for example, during an air bag system activation.

Figure 6:
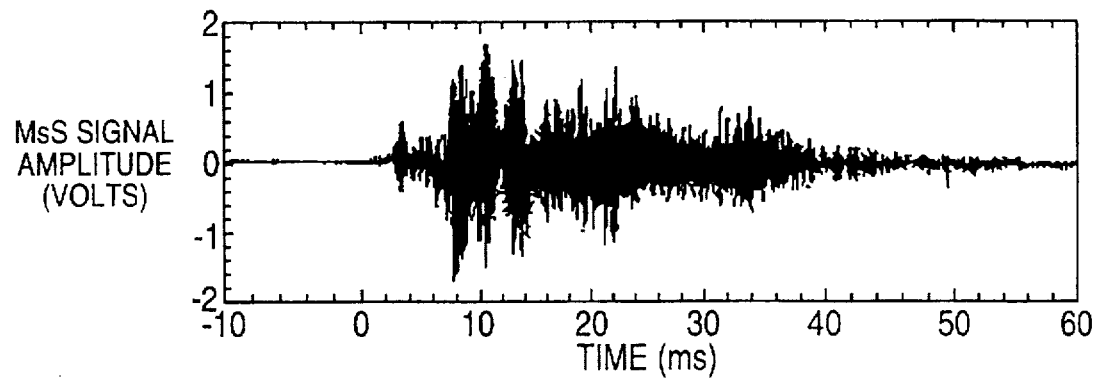
FIG. 6 is a transient signal waveform which shows the signal amplitude in volts vs. time of an output signal of a magnetostrictive sensor during a rapid depressurization of a compressed gas cylinder reflected by the graph in FIG. 5.

FIG. 6 shows an example of the transient stress signals detected with the above described magnetostrictive sensor in place on the cylinder wall during the rapid depressurization depicted in FIG. 5. The rapid discharge of the stored gas produces a complicated amplitude signal resulting from the change in magnetic flux due to the transient stress produced on wall 4 of the cylinder. In accordance with the invention, the complicated amplitude signal output from the magnetostrictive sensor is processed according to a signal processing algorithm to determine the pressure level of the gas at the ignition of the system activation. The signal processing algorithm of the invention is robust in that it reliably determines the stored gas pressure amidst various extraneous factors encountered in practice that also affect the signals, including, for example, variation in sensor performance, variation in the material properties and geometry of the walls of the cylinder and temperature.

According to one embodiment of the method of the invention, the amplitude data shown for example in FIG. 6, is converted to an energy waveform by squaring the data, passing the energy waveform through a low-pass filter, and then determining an interval between the time of initiation of the depressurization and the time at with the energy waveform first reaches a predetermined energy level.

Figure 7B:
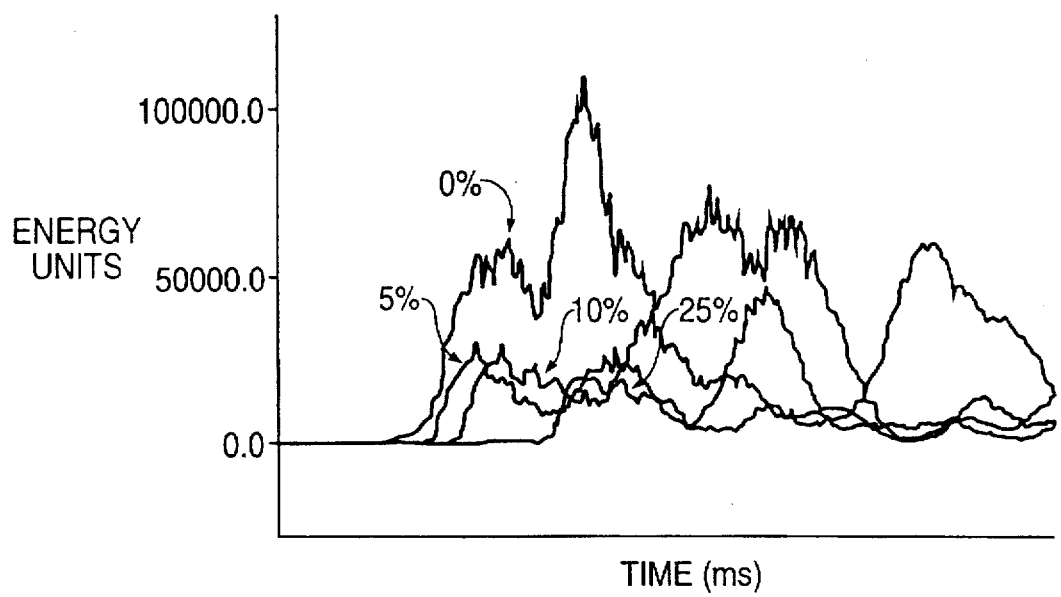
FIG. 7b is a graph showing energy waveforms vs. time for various compressed gas pressures during a rapid depressurization of compressed gas cylinders for explaining the method according to the first embodiment of the invention.
Figure 7A:
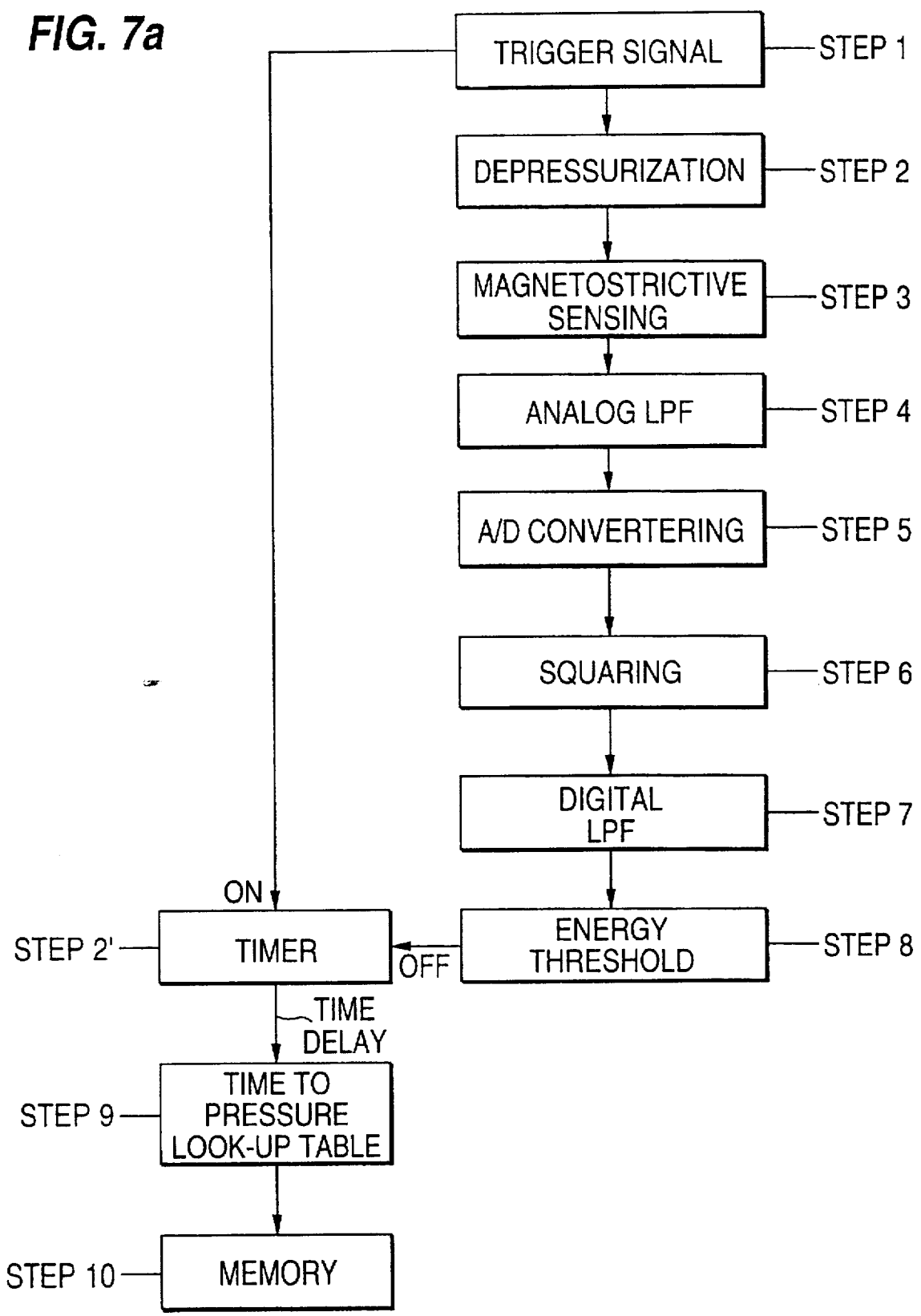
FIG. 7a is a functional flow diagram of the method according to a first embodiment of the invention.

FIG. 7a is a flow diagram illustrating an implementation of this embodiment of the invention. Referring to FIG. 7a, in Step 1 of the method, a trigger signal is generated, for example, in a known manner during detonation of an airbag system and initiates depressurization of a pressure cylinder at Step 2 which causes magnetostrictive sensor 30

(discussed above) to produce a complex voltage output signal at step 3 similar to that in FIG. 6. The trigger signal that initiates depressurization of the pressure cylinder additionally operates as a start signal to turn on a timer at Step 2'. At Step 4, the complex voltage output of sensor 30 is preferably passed through an analog low pass filter, which, for example, has a 20 kHz 3db point and a one pole roll off, and subsequently converted at Step 5 to digital data in an analog-to-digital converter having a 50 kHz sample rate. At step 6 the digital data is squared and the squared data is passed through an FIR (finite impulse response) digital low-pass filter having a 50 Hz 3 db point at Step 7 and then input to an energy threshold stage at step 8 which produces an output signal when the digital low-pass filtered signal exceeds a preset energy threshold. The output signal of the energy threshold stage is employed as an "off" signal that turns off the timer of Step 2'. The output of the timer at Step 2' thus represents a time delay corresponding to the interval between the time of initiation of the depressurization and the time at which the energy wave form reaches the predetermined energy level at Step 8. At Step 9, the time delay is sent to a time-to-pressure look-up table which converts the time delay to a pressure drop relative to a nominal starting pressure in the pressure vessel and outputs the pressure drop to a memory where it is stored at Step 10 for subsequent retrieval.

FIG. 7b shows four energy waveforms created in the above manner, with each waveform corresponding to a different starting compressed gas pressure. The percentages, 0%, 5%, 10%, and 25% refer to the amount of pressure drop from the full nominal pressure value. As shown, the larger the pressure drop from the nominal pressure value, the later the time at which the energy waveform starts to rise. The interval between the initiation time and the time at which the energy waveform reaches a predetermined level, for example, 5,000 energy units, has been found to vary approximately linearly with the initial stored-gas pressure. This relationship between the time interval and gas pressure is attributable to the flow rate, which is proportional to the initial gas pressure.

The above described method may be implemented in an automobile by using a digital electronic circuit including, for example, a microprocessor, which processes the signals from the magnetostrictive sensor after being converted by an analog-to-digital converter into digital data, performs the above-described detection algorithm, and outputs the result to a storage device. The stored information may then be used for post crash analysis to certify that the gas generator functioned properly at the time of its deployment.

As previously discussed it is also useful to perform quality testing at the end of the manufacturing process producing the compressed gas cylinders and/or just prior to installation of the cylinders, for example, in an automobile air bag system. The algorithm that generates the energy waveform in the above described manner by squaring the output data from the magnetostrictive sensor can be used in combination with an artificially created stress on the wall of the cylinder which does not require depressurization of the cylinder. According to this aspect of the invention, a mechanical impact is applied to the wall of the cylinder, for example, by dropping a steel ball bearing from a designated height onto the wall of the cylinder. In this case, it has been found that the peak amplitude of the energy waveform is related to the level of the pressure in the cylinder. Specifically, the peak amplitude of the energy waveform increases with a decrease in gas pressure in the cylinder.

Figure 8A:
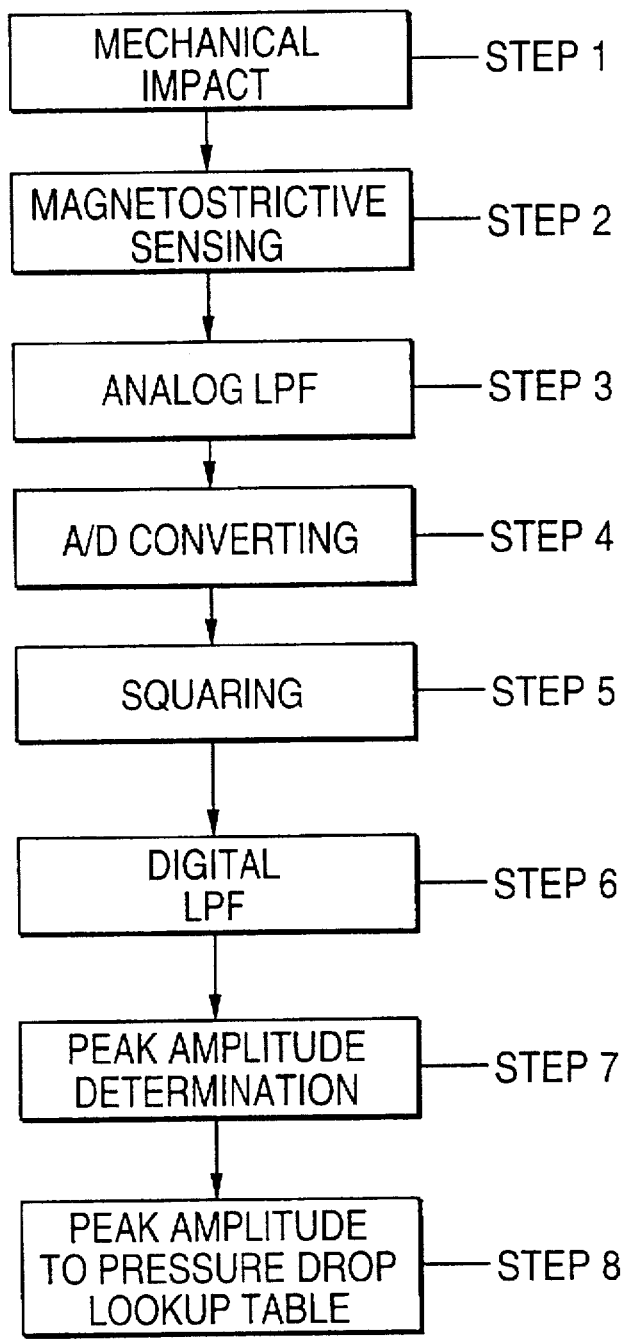

A flow diagram for implementing this aspect of the invention is shown in FIG. 8a wherein at Step 1 a mechanical impact as mentioned above is imparted to the wall of a pressure cylinder and at Step 2 a magnetostrictive sensor, such as sensor 30 described above, outputs a complex voltage signal. Steps 3 to 6 in FIG. 8a are similar to Steps 4 to 7 in FIG. 7a, wherein the output signal of the sensor is passed through an analog low pass filter, converted to digital data, squared and passed through a digital low pass filter. The output of the digital low pass filter at Step 6 in FIG. 8a is analyzed at Step 7 for determining a peak amplitude. The peak amplitude determined at step 7 is then converted in a look-up table to a pressure drop from a nominal value at step 5.

FIG. 8b shows energy waveforms for various gas pressures obtained according to the above described method from which it can be seen that the peak amplitude of the energy waveform increases with respectively increasing pressure drops from the nominal pressure. This behavior is believed to be due to the attenuation of impact signals caused by the stored gas that increases with the gas pressure.

As can be seem from FIG. 8b, the peak amplitude of the energy waveforms can be utilized to delineate large pressure drops. There is not much delineation, however, between the nominal pressure (0% pressure drop) and a 5% pressure drop. Accordingly, it would be preferable to have a more robust algorithm which has a better delineation between the smaller pressure drops.

FIG. 9a shows a flow diagram for a signal processing algorithm which accomplishes this goal. According to this embodiment of the invention, the raw data of the sensor output is bandpass filtered in a 30 kHz to 40 kHz bandpass filter at Step 1 and subsequently converted to digital data in an analog-to-digital data converter at Step 2. The digital data is converted to the frequency domain by fast fourier transforming at Step 3 and the magnitude of the frequency amplitudes is low passed filtered at Step 4. At Step 5, a determination is made of the frequency having the maximum amplitude and at Step 6, that frequency is converted to a pressure drop in a frequency-to-pressure drop look-up table.

FIG. 9b shows the results of a signal processing algorithm according to FIG. 9a with the magnetostrictive sensor being used to detect transient stress in the cylinder wall caused by a mechanical impact, for example, a steel ball dropped from a designated height as previously discussed. The detected signals are fast fourier transformed to create frequency spectrum data according to the flow diagram of FIG. 9a.

FIG. 9b shows the frequency spectrum data resulting from four compressed gas cylinders maintained at four different pressures, with 0% pressure drop corresponding to the nominal pressure and 5%, 10%, 25% and 100% indicating pressure drops from the nominal pressure. As can be seen, each frequency spectrum representing the different pressures has a peak or spike. The magnitude of the peak is irrelevant for the purposes of analysis. However, the actual frequency of the peak correlates quite well with pressure. That is, in general, the greater the pressure the higher the peak frequency. In this particular example, the peaks occurred within a range of 31 kHz to 36 kHz. The peak frequency can then be utilized to delineate the pressure drop in the cylinder as discussed in connection with FIG. 9a.

The invention has been described in detail with respect to preferred embodiments, and it will not be apparent from the foregoing to those skilled in the art that changes and modifications may be made without departing from the invention in its broader aspects, and the invention, therefore, as defined in the appended claims, is intended to cover all such changes and modifications that falls within the true spirit of the invention.

What is claimed is:

1. A method for non-invasively monitoring a pressure of a compressed gas inside a closed container having an outside wall, comprising:

forming a magnetic circuit through a portion of the outside wall of the container;

generating a transient stress in the outside wall of the container;

detecting magnetic flux amplitude changes in the magnetic circuit created by the transient stress in the outside wall of the container;

producing data representing the magnetic flux amplitude changes; and monitoring pressure changes from a nominal pressure by evaluating the data representing the magnetic flux amplitude changes.

2. The method according to claim 1, wherein the monitoring step includes:

converting the data to frequency domain data;

detecting a peak frequency from the frequency domain data; and comparing the peak frequency with a calibrated frequency corresponding to the nominal pressure to determine a variation in pressure from the nominal pressure.

3. The method according to claim 2, wherein the converting step includes fast fourier transforming the data.

4. The method according to claim 1, wherein the comparing step includes comparing the peak frequency with a calibrated frequency which corresponds to a 0% pressure drop from the nominal frequency.

5. The method according to claim 1, wherein the generating step includes applying a mechanical impact to the outside wall of the container for generating the transient stress.

6. The method according to claim 5, wherein the applying step includes dropping a ball bearing onto the outside wall of the container from a predetermined height.

7. The method according to claim 1, wherein the forming step includes using a magnetostrictive sensor that includes a magnet and placing the magnetostrictive sensor on the outside wall of the container for forming the magnetic circuit and the detecting step includes using the magnetostrictive sensor for detecting the magnetic flux changes.

8. The method according to claim 7, wherein the magnetostrictive sensor includes a magnet having a U-shaped cross-section presenting first and second legs and a wire forming first and second windings disposed on the first and second legs, respectively, of the magnet.

9. The method according to claim 7, wherein the magnetostrictive sensor has a curved bottom surface and the placing step includes placing the curved bottom surface of the magnetostrictive sensor on the wall of the container.

10. A method for non-invasively monitoring a pressure of a compressed gas inside a closed container having an outside wall, comprising:

forming a magnetic circuit through a portion of the outside wall of the container;

detecting magnetic flux amplitude changes in the magnetic circuit created by a transient stress in the outside wall of the container due to rapid depressurization of the container;

producing data representing the magnetic flux amplitude changes;

converting the data into an energy waveform that represents a measure of energy and evaluating the energy waveform;

low pass filtering the energy waveform; and evaluating a performance of the depressurization of the container by determining an interval between a point in time from initiation of the rapid depressurization to a point in time at which the energy waveform first reaches a predetermined energy level.

11. The method according to claim 10, wherein the converting step includes squaring the data.

12. The method according to claim 10, and further including the step of generating a mechanical stress in the outside wall of the container, and wherein the evaluating step includes detecting a peak amplitude of the energy waveform created as a result the generating step and determining a variation in pressure from a nominal pressure by comparing the peak amplitude with a calibrated amplitude that corresponds to the nominal pressure.

13. The method according to claim 12, wherein the generating step includes applying a mechanical impact to the outside wall of the container for generating the transient stress.

14. The method according to claim 13, wherein the applying step includes dropping a ball bearing onto the outside wall of the container from a predetermined height.

15. The method according to claim 12, wherein the comparing step includes comparing the peak amplitude with a calibrated amplitude which corresponds to a 0% pressure drop from the nominal pressure.

16. The method according to claim 10, wherein the forming step includes using a magnetostrictive sensor that includes a magnet and placing the magnetostrictive sensor on the outside wall of the container for forming the magnetic circuit and the detecting step includes using the magnetostrictive sensor for detecting the magnetic flux changes.

17. The method according to claim 16, wherein the magnetostrictive sensor includes a magnet having a U-shaped cross-section presenting first and second legs and a wire forming first and second windings disposed on the first and second legs, respectively, of the magnet.

18. The method according to claim 16, wherein the magnetostrictive sensor has a curved bottom surface and the placing step includes placing the curved bottom surface of the magnetostrictive sensor on the wall of the container.

* * * * *